US012242112B2

(12) United States Patent
Hentz et al.

(10) Patent No.: US 12,242,112 B2
(45) Date of Patent: Mar. 4, 2025

(54) ELECTRO-OPTICAL CONVERSION SYSTEM

(71) Applicants: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE DE PARIS, Paris (FR)

(72) Inventors: Sébastien Hentz, Grenoble (FR); Ivan Favero, Paris (FR); Guillaume Jourdan, Grenoble (FR); Julien Renard, Seyssinet-Pariset (FR); Nicolas Roch, Grenoble (FR)

(73) Assignees: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE DE PARIS, Paris (FR)

( * ) Notice: Subject to any disclaimer, the term of this patent is extended or adjusted under 35 U.S.C. 154(b) by 512 days.

(21) Appl. No.: 17/724,011

(22) Filed: Apr. 19, 2022

(65) Prior Publication Data

US 2022/0334314 A1    Oct. 20, 2022

(30) Foreign Application Priority Data

Apr. 20, 2021  (FR) ...................................... 2104085

(51) Int. Cl.
*G02B 6/293* (2006.01)
*G02B 6/12* (2006.01)
(Continued)

(52) U.S. Cl.
CPC ....... *G02B 6/2934* (2013.01); *G02B 6/12009* (2013.01); *H04B 10/25759* (2013.01); *H04B 10/503* (2013.01)

(58) Field of Classification Search
CPC  G02B 6/2934; G02B 6/12009; G02B 6/1225; G02B 2006/12142;
(Continued)

(56) References Cited

U.S. PATENT DOCUMENTS 9,036,951 B2    5/2015   Bhave et al.
9,260,289 B2    2/2016   Park
10,788,687 B2   9/2020   Taurel et al.

FOREIGN PATENT DOCUMENTS

EP    3 094 998 B1    4/2019

OTHER PUBLICATIONS

Search Report as issued in French Patent Application No. 2104085, dated Dec. 7, 2021.
(Continued)

*Primary Examiner* — Leslie C Pascal
(74) *Attorney, Agent, or Firm* — Pillsbury Winthrop Shaw Pittman LLP (57) ABSTRACT

An electro-optical conversion system including an opto-mechanical conversion device which includes a ring cavity formed by an optical waveguide which extends along an annular closed curve, a micromechanical resonator that comprises at least one microbeam, and a zipper type element integrated into the ring cavity, the zipper type element including a first arm made on a portion of the ring waveguide and a second arm made on the microbeam. The conversion system also includes a capacitor with first and second electrodes separated by a gap which varies when the microbeam oscillates.

15 Claims, 2 Drawing Sheets

(51) Int. Cl.
*H04B 10/2575* (2013.01)
*H04B 10/50* (2013.01)

(58) Field of Classification Search
CPC ............ G02B 6/12004; G02B 6/12007; H04B 10/25759; H04B 10/503; B82Y 20/00
See application file for complete search history.

(56) References Cited

OTHER PUBLICATIONS

Fan, L., et al., "Superconducting cavity electro-optics: A platform for coherent photon conversion between superconducting and photonic circuits," Science Advances, vol. 4, No. 8, Aug. 2018, XP055866630, DOI: 10.1126/sciadv.aar4994, Retrieved from the Internet: URL:https://par.nsf.gov/servlets/purl/10076586>, 5 pages.

Einat, A., et al., "Analysis of the optical force in the Micro Ring Resonator References and links," Optics Express, vol. 19, No. 21, Oct. 2011, XP055864378, Retrieved from the Internet: URL:https://www.osapublishing.org/oe/fulltext.cfm?uri=oe-19-2120405&id=222907>, 15, pages.

Arnold, G., et al., "Converting microwave and telecom photons with a silicon photonic nanomechanical interface," Nature Communications, vol. 11, (2020), XP002804874, 7 pages.

Sauer, V. T. K., et al., "Optical racetrack resonator transduction of nanomechanical cantilevers," Nanotechnology 25, (2014), 12 pages.

ELECTRO-OPTICAL CONVERSION SYSTEM

CROSS-REFERENCE TO RELATED APPLICATIONS

This application claims priority to French Patent Application No. 2104085, filed Apr. 20, 2021, the entire content of which is incorporated herein by reference in its entirety.

FIELD

The technical field is that of opto-mechanical conversion devices for converting a mechanical excitation into a light vibration and vice versa, and of electro-optical conversion systems comprising such a device. The present technology relates in particular to such a system, in which the opto-mechanical conversion device comprises a resonant optical cavity coupled to a micromechanical oscillator such as a MEMS or NEMS type oscillator. Such a system can in particular be employed as a quantum interconnect.

BACKGROUND

The applications of quantum physics have developed rapidly in recent years, in the field of information exchange and processing. Significant progress has been made in the field of quantum computation, for which operation is carried on quantum states (for example Q-bits) of systems well isolated from their environment, instead of performing logical operations on conventional bits. The field of quantum telecommunications, mainly in the optical domain, has also experienced a strong development.

In this context, interfacing two quantum computation systems distant from each other, so that they can exchange quantum variables between them, with minimal alteration of these variables (for example by preserving quantum entanglement properties) is an important challenge.

For long distance communication, an optical communication (via optical fibers for example) is one of the most adapted solutions. In particular, it is more adapted than transmission by superconducting electric lines, which requires cooling to very low temperatures and for which the typical attenuation distances are much lower. As for quantum computation systems, for many current embodiments (for example based on superconducting Q-bits), they implement phenomena and mechanisms whose typical frequencies are in the order of a Gigahertz.

Therefore, in order to interface such a system with a (quantum) communication network, it would be particularly interesting to have a conversion system between the microwave domain (gigahertz) on the one hand, and the optical domain on the other hand (wavelength in the order of one micron, namely a frequency in the order of a hundred terahertz or more).

In this context, the following article describes an electro-optical conversion system allowing conversion from the microwave range to an optical telecom wavelength, and vice-versa: "Converting microwave and telecom photons with a silicon photonic nanomechanical interface", G. Arnold et al, Nature Communications volume 11, Article number: 4460 (2020).

Figure 1:
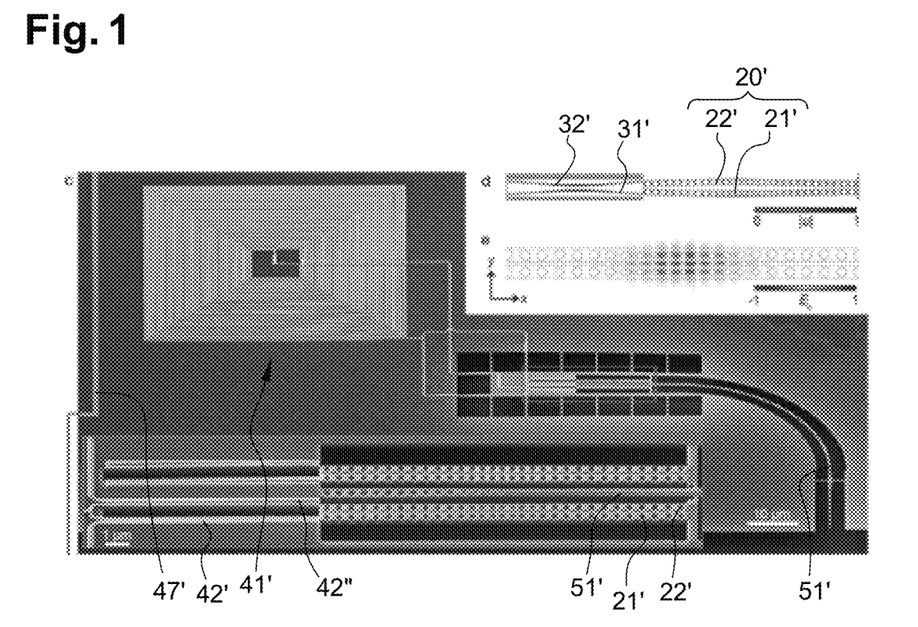
FIG. 1 schematically represents an electro-mechanical conversion system of prior art.

This system, represented in FIG. 1, comprises an electrical resonant circuit which includes an inductor 41' which is made as an electrical spiral track, and which is connected to a pair of two electrical capacitors 42' and 42". The resonant frequency of this circuit is in the order of 10 GHz. It is coupled to an electrical transmission line 47' that passes in proximity to the electrical track in question.

This system also includes a "zipper" type optical element 20' (sometimes called "zipper cavity"), which includes a first arm 21' and a second arm 22' substantially parallel to each other and which extend opposite each other, a line of periodically repeated holes being made on each of these arms. This optical resonator has a resonant frequency of about 200 THz, corresponding to a wavelength (in vacuum) of about 1.5 micron. It is coupled to an optical transmission line 51' which passes in proximity to this resonator (evanescent wave coupling).

The electrical resonant circuit and the zipper cavity are coupled to each other via a mechanical resonant system that includes two microbeams 31' and 32'. One of the two electrodes of the capacitor 42' is made on the microbeam 31'. Similarly, one of the two electrodes of the capacitor 42" is made on the microbeam 32'. This allows an electromechanical coupling between the electrical resonator and the mechanical resonator.

Besides, each of these microbeams 31' and 32' is formed in the extension of one of the arms 21', 22' of the zipper cavity, so that the flexural oscillation of these microbeams deforms the arms of the cavity, locally spacing them apart from each other, which allows an opto-mechanical coupling between the mechanical resonator and the zipper cavity.

This system then allows a conversion from the microwave domain to the optical telecom domain.

For an efficient conversion, it is desirable that the electro-mechanical and opto-mechanical coupling coefficients be high. It is also desirable that the electrical, mechanical and optical losses in each of these resonators be as low as possible (especially in the perspective of quantum variable transfer).

In particular, it is desirable that the quality factors of the electrical and optical resonators be very high. This makes it possible, among other things, to fulfill the so-called resolved side-band condition, by virtue of which the mechanical resonator can be cooled by phonon pumping ("side-band cooling"), thus bringing the resonator into its fundamental quantum state.

In the system described in the above-mentioned article by G. Arnold et al., the zipper cavity 20' allows for efficient opto-mechanical coupling. It also allows for compact integration, in integrated optics. But its quality factor (intrinsic quality factor, without taking the coupling to the optical transmission line into account) remains limited, equal to about $1.3 \cdot 10^5$ (which may not be enough for side-band cooling).

SUMMARY

In this context, an electro-optical conversion system is provided, comprising:
an opto-mechanical conversion device that includes:
a ring cavity, formed by an optical waveguide which extends along an annular closed curve,
a micromechanical resonator comprising at least one microbeam, and
a zipper type element integrated to the ring cavity, this element including a first arm and a second arm which extend parallel to each other, opposite each other, the first arm being made on a portion of the ring waveguide while the second arm is made on the microbeam, the microbeam and the portion of the guide being laterally separated from each other by a gap which varies at least locally when the microbeam oscillates, the system also comprising an electrical capacitor that includes a first electrode and a second electrode, the first electrode moving relative to the second electrode upon oscillation of the microbeam.

The (intrinsic) quality factors that can be achieved in practice for a ring cavity in integrated optics can be very high, typically higher than $10^6$. These quality factors are generally higher than for a usual zipper cavity, where the three-dimensional confinement of the optical field is produced by the line of repeated patterns, in the absence of a ring.

Zipper cavities, on the other hand, allow high opto-mechanical coupling coefficients.

Integrating a zipper type element along a ring cavity allows the resulting composite optical cavity to achieve a good compromise between a high quality factor and a high opto-mechanical coupling coefficient. The fact that the zipper type element is looped back on itself, by means of the ring waveguide, makes it possible in particular to avoid the optical losses that usually occur at both ends of a linear zipper cavity such as that of above-mentioned prior art (G. Arnold et al.). This composite system allows the device performance (especially in terms of quality factor, optical transmission, and coupling coefficient) to be adjusted with more freedom.

By zipper type element, hereinafter referred to simply as a zipper element, it is meant an element comprising the first and second arms in question, made of a material transparent to the radiation under consideration, which extend parallel to each other, opposite each other, being separated from each other by a thin empty interval (or interval filled with air, or another gas) and arranged so as to confine an electric field of optical frequency between and/or in the arms in question. At least one of the arms is deformable (under the action of radiation pressure and/or electro-mechanical actuation), the width of the interval in question varying when that arm deforms. In particular, it may be provided that at least one of the first and second arms has a line of patterns regularly repeated along that arm (a line of patterns which is possibly curved, if the arm in question is curved). In this case, the confinement of the electromagnetic field can be modified by the presence of the line of patterns. These patterns can be periodically or semi-periodically repeated along the arm in question. When the patterns are semi-periodically repeated, the distance between two adjacent patterns is equal to a same pitch P for the different pairs of adjacent patterns, but to within a certain accuracy, for example to within 20%, or 50%. In other words, a variation (for example less than 50%, or 20%) of the distance between two adjacent patterns is possible, along the arm under consideration. This variation can be regular (for example constant) from one pattern to the other, and correspond either to an increase in the pitch from one pattern to the other, from the middle of the arm to each of its two ends, or to a decrease in the pitch from the middle of the arm to each of its two ends. This allows a form of apodization of the zipper element. Similarly, it could be provided that the shape (for example, depth) of the patterns varies slightly from one pattern to the other.

The fact that the first and second arms extend parallel to each other does not mean that they are necessarily rectilinear. Each of these two arms may have an overall curved shape (follow a curved line). The fact that these two arms extend parallel to each other means that a distance between these two arms remains constant or at least substantially constant along the zipper element. In other words, each arm has an elongated shape that conforms to the other arm (at a small distance from it). As an example, when these two arms are rectilinear, they may be parallel to each other to within 10 degrees, or better.

Further to the features presented above, the opto-mechanical conversion system described above may have one or more of the following optional features, considered individually or according to any technically feasible combination:

at least one of the first and second arms has a line of patterns repeated periodically or semi-periodically along that arm;

grooves are periodically or semi-periodically distributed on a flank of the microbeam located opposite a flank of the waveguide portion, or, grooves are periodically or semi-periodically distributed on a flank of the waveguide portion located opposite a flank of the microbeam;

the patterns comprise (for example take the form of) protruding planar facets, located on the flank of the microbeam or on the flank of the waveguide portion, the facets being separated two by two by the grooves;

the facets are located in a same plane;

the patterns form a crenellation;

the grooves each have a trapezoidal, flat-bottomed, or triangular profile the grooves each have an incurved bottom, for example hemicircular;

the grooves are perpendicular to a mean plane in which the ring cavity is located; the mean plane is the plane of a layer in which the ring cavity is etched, as well as the microbeam;

a gap, which separates the portion of the waveguide from the microbeam at the planar facets, is less than 0.1 micron;

the microbeam comprises a flank located opposite a flank of the waveguide portion;

these two flanks are separated from each other, at least in places, by a distance less than 0.1 micron;

the patterns are internal to the arm under consideration, and are located neither on the flank of the microbeam nor on the flank of the waveguide portion; the patterns are, for example, holes passing through the waveguide portion or the microbeam along a direction perpendicular to a substrate supporting the system;

the line of periodically or semi-periodically repeated patterns is located on the first arm of the zipper cavity, and another line of periodically or semi-periodically repeated patterns is also present on the second arm of the zipper cavity;

the patterns of the other line have the same shape (for example, a crenelated shape, or a hole shape in the microbeam or in the waveguide portion) as the patterns of the line;

the patterns of the other line are repeated with a pitch that is the same as the pitch between patterns of the line;

the patterns of the other line are each located facing one of the patterns of the line (that is, in line with one of the patterns of the line, in coincidence with that pattern);

the microbeam extends from a first end to a second end of the microbeam, and is held fixed at both ends;

the ring cavity and the microbeam are etched into a silicon top layer of a Silicon-on-Insulator type substrate;

the micromechanical resonator includes an additional microbeam, the microbeam and the additional microbeam connecting to each other by at least one of their respective ends, the micromechanical resonator having a symmetrical oscillation mode for which a center of mass of the assembly comprising the microbeam and the additional microbeam remains stationary (upon oscillation of the microbeams in question);

the microbeam and the additional microbeam are etched into a membrane (for example at least partially suspended), formed by a first material;

the additional microbeam is separated from a main, fixed part of the membrane by a narrow slit which extends parallel to the additional microbeam;

at least a part of a top face of the additional microbeam is covered by the first electrode, formed by an electrically conductive second material;

the second electrode extends side by side with the first electrode, parallel to the first electrode, and over the fixed main part of the membrane, on another side of the slit;

the microbeam has a top face that is substantially devoid of the electrically conductive second material;

the system comprises an electrical resonant circuit including the electrical capacitance and an inductor;

the inductor includes an electrical track of very small thickness made of a superconducting material chosen so that the track has a high kinetic inductance;

the thickness is less than 20 or even less than 10 or even 5 nanometers;

the superconducting material is one of the following materials: titanium nitride, niobium nitride or a granular superconducting material.

The present technology also relates to a method for manufacturing an electro-optical conversion system comprising an opto-mechanical device, from a substrate comprising a silicon oxide layer and a silicon layer on the silicon oxide layer, the method comprising the following steps of:

lithographing and etching the silicon layer in a pattern defining:

a mechanical resonator comprising at least one microbeam, a ring cavity formed by an optical waveguide which extends along a closed annular curve, and a zipper type element integrated into the ring cavity, this element including a first arm and a second arm which extend parallel to each other, opposite each other, the first arm being made on a portion of the ring waveguide while the second arm is made on the microbeam, and then etching the silicon oxide layer by chemical attack, to release the mechanical resonator and the ring cavity, the method also comprising making, on the silicon layer, an electrical capacitor including a first electrode and a second electrode, the first electrode moving relative to the second electrode upon oscillation of the microbeam.

The present technology and its various applications will be better understood upon reading the following description and examining the accompanying figures.

BRIEF DESCRIPTION OF THE FIGURES

The figures are set forth for illustrative and by no means limiting purposes.

DETAILED DESCRIPTION

Figure 2:
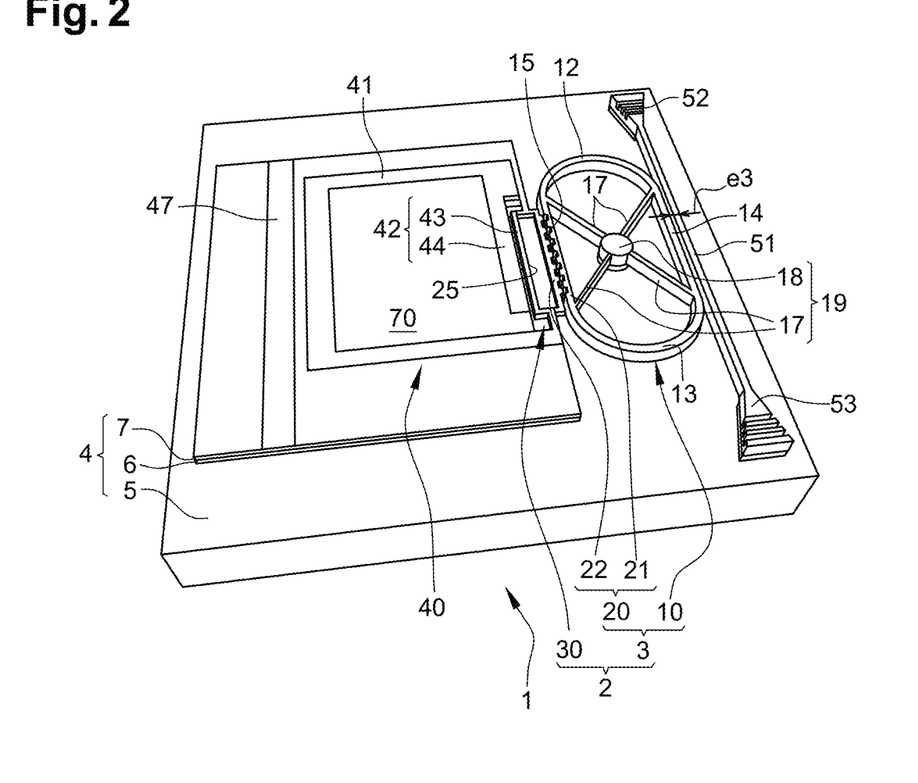
FIG. 2 schematically represents a new electro-mechanical conversion system, seen in perspective.

FIG. 2 shows an electro-optical conversion system 1 for converting photons from the microwave domain into photons from the optical domain, and vice versa.

This system 1 comprises:

an electrical resonant circuit 40 that includes an inductor 41 and an electrical capacitor, 42, a micromechanical resonator 30 which includes at least one, here two microbeams 22 and 25, and a composite optical resonator 3 that includes a ring cavity 10 that integrates a zipper element 20 that has one of its arms, 21, made along a portion of the ring cavity 10.

The micromechanical resonator 30 is coupled to this optical resonator 3, because the second arm of the zipper element 20 is made on one of the microbeams, 22, of the micromechanical resonator. An oscillation of this first microbeam 22 (in this case a flexural oscillation) then modifies the gap between the first and second arms of the zipper element 20, thus modulating the properties of the optical resonator 3 and thus obtaining a coupling between the electric field confined therein on the one hand (confined in particular at the zipper element), and the movement of the microbeam 22 on the other hand.

The micromechanical resonator 30 is also coupled to the electrical resonant circuit 40 because one of the two electrodes of the capacitor 42 of this circuit is made on one of the two microbeams of the micromechanical resonator 30, in this case on the microbeam 25 (see FIG. 2). Oscillation of this second microbeam 25 thus varies the capacitance of capacitor 42. And, conversely, the application of an electric voltage between the capacitor electrodes exerts a force on this microbeam.

Besides, the first and second microbeams 22 and 25 are mechanically coupled to each other, in this case because they connect to each other by their respective ends. Thus, a flexure of one of these microbeams leads to a flexure of the other of these microbeams, as for two legs of a tuning fork (except that the microbeams are each held at their two ends here). Here, more precisely, the micromechanical resonator has a symmetrical oscillation mode, for which a center of mass of both microbeams 22, 25 remains stationary, or at least substantially stationary upon oscillation of the microbeams. And since the first microbeam 22 is coupled to the optical resonator 3 while the second microbeam 25 is coupled to the electrical resonator 40, an electro-optical type coupling between the electrical resonator 40 and the dual cavity optical resonator 3 is ultimately achieved.

The electro-optical conversion system 1 is made here on a substrate 4 including at least three layers: a main layer 5 that serves as a support, a top layer 7, in which the ring cavity 10 and the microbeams 22, 25 are etched, and a spacer layer 6, which extends between the main layer 5 and the top layer 7. The top layer 7 is made of a material that is transparent to the wavelengths in the optical domain intended to resonate in the optical resonator 3.

Here, the substrate 4 is a SOI (that is: Silicon on Insulator) type substrate, for which the main layer 5 is made of silicon Si, the spacer layer 6 is made of silicon oxide $SiO_2$, and for which the top layer 7 is also made of silicon Si (this layer is usually called the "Si top" layer in this technical field). It may be noted that the top layer 7 may be thinned in places, and does not necessarily has a constant thickness over the entire surface occupied by the system 1.

The opto-mechanical conversion device 2 itself, which includes the composite optical resonator 3 and the micromechanical resonator 30, is now described in more detail. The electrical resonant circuit 40 is described next.

As already indicated, this optical resonator 3 includes the ring cavity 10 and integrates a zipper element 20, one arm of which being made on a portion of the ring cavity 10.

The ring cavity 10 is etched into the top layer 7 of the substrate. It includes an optical waveguide which extends along a closed curve forming a ring, and along which the light confined in the cavity is guided. In this case, this waveguide has a rectangular section. The flanks of the guide, which delimit it laterally, are obtained by etching the top layer 7 (these flanks are perpendicular to this layer). At the ring cavity 10 (more precisely, under the waveguide), the spacer layer 6 has been removed, so that the remaining part of the top layer, which forms the waveguide, is suspended. This provides a high index contrast between the guide itself and the space around it. It will be noted that the width of the waveguide can vary along this cavity, especially to achieve good adaptation of the optical mode on either side of the zipper structure (between the zipper part on the one hand, and the rest of the annular waveguide on the other hand).

Here the ring cavity 10 includes, successively: a first portion 14, here rectilinear, then a first bend 12, for example hemicircular, then a second portion 15, here rectilinear, and finally a second bend 13, for example hemicircular too, which closes this loop by connecting to the first portion 14

An optical coupling between the ring cavity 10 and an optical transmission line 51 is performed along the portion 14. Optically, the optical transmission line 51 serves as an input and output channel to the conversion system. Along the portion 14, a small gap e3 separates the waveguide from the cavity on the one hand, and the optical transmission line 51 on the other hand, and this over a large interaction length, thus promoting an efficient evanescent wave coupling. This transmission line 51 is formed by another optical waveguide, also etched into the top layer 7 of the substrate. As represented in FIG. 2, the portion 14 and the transmission line 51 are both rectilinear. Alternatively, however, they could both be curved (portion 14 and transmission line nevertheless extending parallel to each other, even if curved, to allow the above-mentioned evanescent wave coupling).

As already indicated, the portion 15 is rectilinear, here. Alternatively, however, it could be curved (in which case the microbeam 22 would also follow a curved line, so as to conform to the portion 15, at a small distance therefrom).

The suspended ring cavity 10 is held above the main layer 5 of the substrate by a support system 19 that connects this main layer to the ring waveguide. This support system 19 comprises here:

an island 18, obtained by etching the top layer 7 and the spacer layer 6, the spacer layer partly remaining, under the island 18 (or being replaced, at least partly, by polycrystalline silicon inclusions introduced by virtue of holes made in layers 6 and 7, at the island, thus obtaining an anchoring size of the island 18 independent of the step of etching the layer 6), so that this island 18 rests on the main layer 5 with which it is integral, and holding armatures 17, here four in number, which connect the island 18 to the ring waveguide, and which are etched into the top layer 7 (the spacer layer 6 being removed, under these armatures).

The width of the ring waveguide can be increased locally at the junction between the guide and the armatures in question, so as to move the propagation mode away from these armatures, in order to increase the quality factor of the resonator 3. As for the armatures 17, they could instead be less wide at their end, where they connect to the waveguide, in order to disturb the propagation in the latter as little as possible.

Here, the island 18 is located in the center of the ring formed by the cavity 10.

In terms of dimensions, the ring cavity 10 has, for example, a perimeter between 3 and 300 microns, or even between 50 and 150 microns. Its section, which is rectangular, has, for example, a height and a width each between 0.1 and 2 microns (or even between 0.1 and 0.5 microns for the height). Here, this height (which corresponds, for example, to the initial thickness of the top layer 7, before etching) is more precisely between 150 and 250 nm, while this width (width of the ring waveguide) is between 100 and 200 nm.

As already mentioned, the first arm 21 of the zipper element 20 is made along the portion 15 of the ring cavity, while its second arm 22 is made on the first microbeam 22 of the micromechanical resonator 30.

Each arm 21, 22 here includes patterns 23, 24 periodically repeated along that arm, with a pitch P (a pitch that can vary regularly from the ends toward the center of the arm; the pitch P can have a value close to, or less than, the intended working wavelength of the device). In the present case, these patterns are obtained:

by etching grooves on the flank of the microbeam 22 that is located opposite the ring cavity, and by etching grooves on the flank of the ring waveguide that is located opposite the microbeam 22.

It is thus on these two flanks, located opposite each other, that the periodically repeated patterns 23, 24 are formed.

The patterns 23 present on the first arm 21, and those, 24, present on the second arm 22 are of the same shape, are repeated with the same pitch P, and are located facing each other (that is, each pattern 24 is located at right angles to one of the patterns 23, in coincidence with it). On each arm, the total number of patterns is, for example, between 10 and 100.

The grooves made on the flanks of the waveguide and of the microbeam in question are here grooves which extend vertically, that is, along an axis perpendicular to the plane of the substrate 4. They each extend vertically over the entire thickness of the microbeam, or, respectively, over the entire thickness of the ring waveguide. They are periodically repeated, being separated two by two by the pitch P. In this case, they are grooves of trapezoidal section, with a flat bottom.

On the flank of the microbeam 22, each pattern 24 includes a planar facet 29, protruding from the rest of the microbeam, the different facets 29 being separated two by two by the grooves in question and being located in a same plane.

Similarly, on the blank of the ring waveguide, each pattern 23 includes a planar facet 28, protruding from the rest of the waveguide, the different facets 28 being separated two by two by the grooves in question and being located in a same plane, parallel to the plane of the facets 29 of the microbeam 22 (at least when this microbeam is at rest, not deformed).

This configuration, in which the two arms 21, 22 each have planar (and coplanar) facets 28, 29, thus achieves a very small spacing between the two arms 21, 22 of the zipper element, and this over a fairly large area, which promotes a strong confinement of the electric field and thus achieves a high opto-mechanical coupling coefficient.

In this case, a gap e1, which, at the planar facets 28 and 29, separates the microbeam 22 from the portion 15 of the ring waveguide, is less than 0.1 micron. In other words, for each facet 28, the gap e1 between this facet and the facet 29 located opposite, on the other arm of the zipper element, is less than 0.1 micron. As an example, this gap may be between 20 and 80 nm.

The gap e1 in question corresponds to the gap between the facets 28 and 29 when the microbeam 22 is at rest (not bent).

When this microbeam oscillates, this gap varies over time, and in a manner that depends on the position under consideration along the microbeam. As mentioned above, it is the variation of this gap that allows the electric field confined in the optical resonator 3 to be coupled to the oscillations of the microbeam. It should be noted that the portion 15 is likely to flexurally vibrate as well (under the effect of a radiation pressure), here.

This zipper element 20, with its double line of planar facets 28, 29 almost in contact with each other, allows an extremely strong (extremely localized) confinement of the electric field. In practice, it is a quasi-TE type electromagnetic mode: the strong electric field discontinuities are taken advantage of, for the component normal to the surfaces (facets 28, 29) delimiting the small spaces. This allows the mode to be localized in this spacing. Thus, at each pair of patterns 23, 24, the electric field is confined almost entirely in the very thin zone located between the two facets 28 and 29 (thus on the thickness e1 in question). This very strong confinement of the electric field is favorable in terms of opto-mechanical coupling (especially because the locally very high light intensity will produce a significant radiation pressure on the beam, and thus an efficient conversion of optical quantities to mechanical quantities).

From a longitudinal point of view, the device 2 can be configured so that, along the ring cavity 10, the electric field has maximum values at the zipper element 20, and even at the middle of the zipper element (for example, over 5 or 6 patterns located in the middle of the element, if each arm includes 20 to 30 patterns, for example). In other words, the device may be configured so that, in the ring cavity 10, the electric field is confined primarily at the zipper element (and, in that element, between the above-mentioned planar facets, for example).

From a longitudinal point of view, the device 2 could instead be configured such that the electromagnetic energy distribution is homogeneous along the ring, with the integral of the energy density over a given section of the ring cavity 10 being substantially the same throughout the ring cavity 10, and, in particular, being at least approximately the same in the zipper part and in the rest of the cavity. In this case, and for the example zipper element in FIG. 2, in the zipper part, the energy density would be concentrated in the "empty" part, between facets 28, 29 (that is: in the slit that separates the two arms), as explained above.

The opto-mechanical device 2 is configured to operate at the above-mentioned working wavelength $\lambda_o$, that is, to receive and to transmit or emit light at that wavelength. In this case, the working wavelength $\lambda_o$ is one of the resonance wavelengths of the composite optical resonator 3.

The working wavelength $\lambda_o$ may be between 0.4 and 2 microns (in vacuum). Here, it is more precisely equal to 1.5 micron and is therefore well adapted to transmission over long distances by optical fiber (optical telecom band). The corresponding frequency is 203.6 THz.

The above-mentioned numerical simulations provide, for this opto-mechanical conversion device 2, an opto-mechanical coupling rate $g_{IR}$ greater than 10 MHz (transfer rate of a given variable, from a mechanical quantity, to an optical quantity), which therefore corresponds to a very efficient opto-mechanical coupling. As for the intrinsic quality factor Q, a value greater than $10^6$ is expected for the composite optical resonator 3.

As mentioned above, the opto-mechanical conversion device 2 is coupled to the optical transmission line 51, which, from the optical point of view, serves as the input and output line for the device. The optical waveguide that forms this transmission line passes in proximity to the ring cavity 10, along its first rectilinear portion 14. This guide is provided here:

with a first coupling array 52, made at one of the two ends of the guide, and serves, for example, as an input channel, and with a second coupling array 53, made at the other end of the guide, and which serves for example as an output channel.

These periodically textured arrays, which have a progressively flaring section, allow the light flowing in the guide 51 to be coupled to a free propagation mode corresponding to an out-of-plane propagation direction. The light beam emitted by the array 52, 53 under consideration is then collected by an optical system not represented. Conversely, an incident light beam, delivered by such a collection optical system, is coupled into the guide 51 through the array 52 or 53.

As indicated above, the mechanical resonator 30 (FIGS. 2 and 3) includes first and second microbeams 22 and 25, which connect to each other at their respective ends 260, 270, and 260', 270'.

Figure 3:
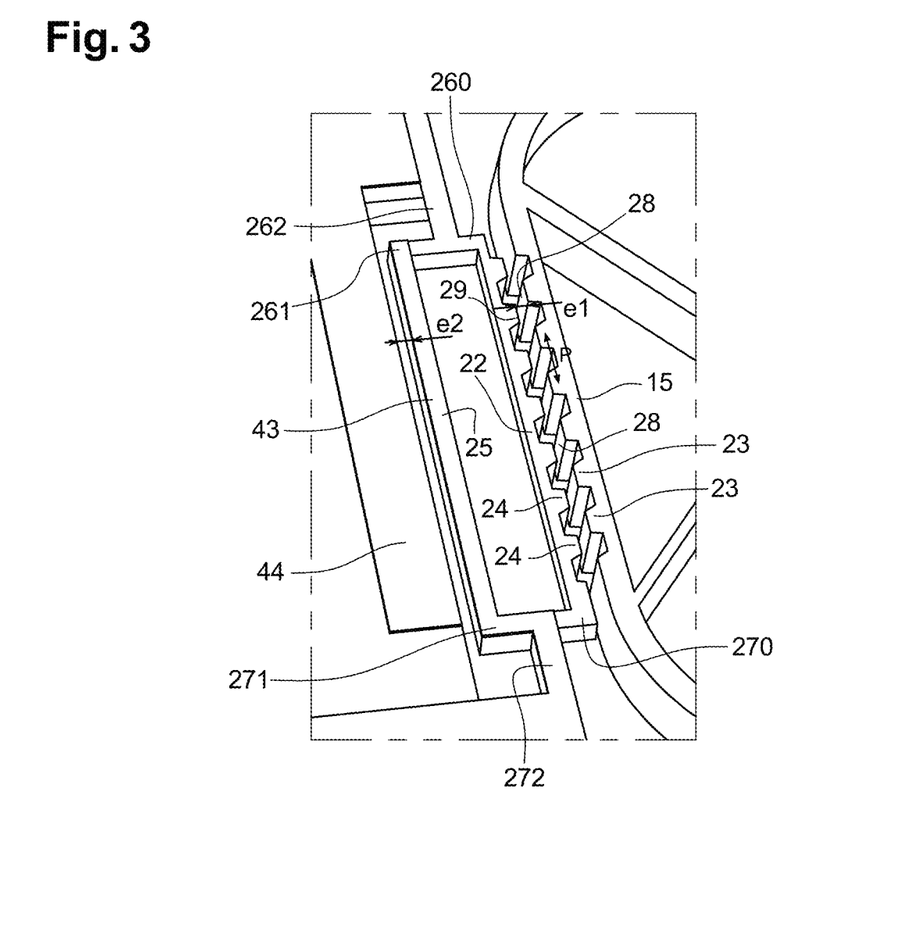
FIG. 3 represents in more detail a mechanical resonator of the system of FIG. 2, seen in perspective.

This resonator takes here the form of a rectangular frame etched into the top layer 7 of the substrate 4, and under which the spacer layer 6 has been removed so that the resonator is suspended.

Here, at the mechanical resonator 30, and also for that matter at the electrical resonator 40, the top layer 7 has been thinned, relative to its original thickness. Once the system 1 is manufactured, this layer is less thick (about half as thick) at the mechanical resonator 30 than at the ring waveguide of the ring cavity 10. Thinning the top layer at the mechanical resonator 30 in this way reduces the mass of the beams 22, 25 (more precisely, the effective mass of the vibration mode under consideration). As an example, the top layer 7 may have a thickness of 100 nm in the zone where the mechanical resonator is made, and a thickness of 200 or 220 nm in the zone where the ring cavity 10 is made.

The part of the layer 7 in which the mechanical resonator 30 is formed, and on which the electrical resonator 40 is made, forms a membrane, a part of which is etched to make the mechanical resonator 30, and which includes a main, fixed part 70 in which the electrical resonator 40 is made. This membrane is partly suspended: it is suspended under the mechanical resonator 30, and can be suspended elsewhere as well (by removing the spacer layer 6 in the zones where it is desired that the membrane be suspended, by chemical attack with hydrofluoric acid HF). For example, the membrane in question may be suspended over the majority of the zone occupied by the electrical resonator 40, to limit electrical conduction losses at the interface between the silica layer 6 and the main silicon layer 5.

In any case, the two microbeams 22, 25 of the mechanical resonator 30 are constituted here by the two long legs of the rectangular frame etched into this membrane (that is: by the two longer sides of the rectangle), and they are connected to each other by the two short sides of the rectangle. Each short side is connected to the main, fixed part 70 of the membrane by a bridge 262, 272.

Each microbeam 22, 25 thus extends from a first end 260, 261 to a second end 270, 271, with its two ends 260 and 270, or 261 and 271, being fixed, or substantially fixed. The microbeam 22, 25 then oscillates by flexurally deforming between these two fixed ends ("double clamp" type geometry). This oscillation takes place mainly parallel to the plane of the substrate 4. In other words, for each portion of the beam, the displacement with respect to its rest position is a vector contained in the plane of the membrane. The ends of the two microbeams 22, 25 are fixed, or nearly fixed, but they nevertheless allow a (flexure) torque to be transmitted from one microbeam to the other, and thus the latter to be mechanically coupled as explained in the preamble. The mode of vibration under consideration here, which is the mode that couples desirably to the optical resonator 3 and the electrical resonator 40, is the above-mentioned symmetrical, balanced mode of vibration in which the center of mass of the two microbeams remains stationary. In this case, the two microbeams vibrate symmetrically (either simultaneously moving away from each other or simultaneously moving toward each other). In order for the resonator to have this symmetrical, balanced mode, the two microbeams 22 and 25 are here symmetrical to each other (or nearly symmetrical) with respect to a median plane. Alternatively, these two microbeams could nevertheless have geometrical characteristics different from each other, as long as their center of mass remains stationary during their oscillation. This arrangement is interesting in practice because such a symmetrical (more precisely, balanced) mode is little coupled to the acoustic noise (mechanical vibrations) possibly present in the system.

Besides, this configuration in which: the first microbeam 22 is coupled to the optical resonator, while the second microbeam 25 is coupled to the electrical resonator 40, these two microbeams being moreover mechanically coupled to each other, makes it possible to avoid depositing a conductive electrode on the first microbeam 22 (see FIGS. 2 and 3), which makes it possible not to modify the properties of the optical resonator 3, and in particular avoids the optical losses that such an electrode could cause.

Moreover, as can be seen in FIGS. 2 and 3, the top face of the second microbeam 25 is covered at least partly, here entirely, by a first electrode 43, formed by an electrically conductive material, whereas the top face of the first microbeam 22 is essentially, here totally, devoid of such an electrode. Further to its interest optically, limiting the amount of conductive material deposited on the mechanical resonator allows the effective mass of the resonator, for the mode under consideration, to be reduced. It also allows the mechanical losses in the resonator to be limited (losses which can be related to slight plastic deformation effects in the electrode(s)). Furthermore, covering only one of the two microbeams only slightly unbalances the above-mentioned symmetric mode (and this unbalance could moreover be compensated for by a slightly larger width for the first microbeam than for the second and/or by slightly different stiffnesses).

A fixed second electrode 44, located opposite the first electrode 43 on the main (fixed) part 70 of the membrane, forms, together with the first electrode 43, the above-mentioned electrical capacitor 42. The respective edges of these two electrodes 43, 44, located opposite each other, are very close to each other. Indeed, the second microbeam 25 is separated from the main part 70 of the membrane by a very thin slit, the width of which is for example less than 0.1 micron. As an example, this width e2 (which corresponds to the average gap of the capacitor 42) may be 50 or 60 nm.

In terms of dimensions, each microbeam 22, 25 has, for example, a thickness between 0.1 and 0.3 micron, a width between 0.1 and 0.5 micron, and a length between 3 and 30 microns. The oscillation frequency of the above-mentioned symmetric mode is typically greater than 1 MHz. It is, for example, between 1 and 100 Megahertz, or even between 1 and 600 Megahertz.

Turning now to the electrical resonator 40, it comprises, as already indicated, the capacitor 42, and the inductor 41, connected between the first 43 and the second 44 electrode of the capacitor. The order of magnitude of the capacitance of the capacitor is the femtofarad, that of the inductor is the hundred nanohenry, and the resonant frequency of the circuit is in the order of a gigahertz or more. It is for example between 1 and 30 Gigahertz.

The inductor is made on the top surface of the main part 70 of the membrane as a track forming one or more loops.

An electrical transmission line 47, which is here an electrical track also made on the top surface of this membrane, extends along a portion of the track that forms the inductor 41. This transmission line serves as an electrical (microwave) input and/or output channel for the conversion system 1.

Remarkably, the track that forms the inductance 41 is an electrical track of very small thickness ep made of a superconducting material chosen so as to obtain an electrical track with a high kinetic inductance Lc.

This makes it possible to increase the inductance per unit length of the track in question. Indeed, its total inductance $L_{tot}$ is the sum of its conventional magnetic inductance $L_m$ (due to the creation of a magnetic field—outside the track—by the current flowing in the track) and its kinetic inductance Lc. The kinetic inductance is usually small compared to the magnetic inductance, and is often not taken into account. But here, the track is configured in such a way as to obtain a high kinetic inductance, for example greater than, or even 3 times greater than its magnetic inductance $L_m$.

Since the total inductance per unit length of the track is thus increased, the length of the track can be reduced in return. In particular, a total inductance having the desired value can be obtained without having to make a spiral track including many turns, such as the one in the conversion system described in the above-mentioned article by G. Arnold et al. in the section relating to the technological background. Thus, as an example, as represented in FIG. 2, the track in question forms a single, in this case rectangular, turn.

It is particularly interesting to be able to dispense with a spiral geometry. Indeed, it makes it possible to reduce the parasitic capacitance of the inductor (in the case of a spiral winding, the electrostatic influence between two successive turns is at the origin of a high parasitic capacitance value). And it is desirable to reduce this parasitic capacitance, which is constant, so that capacitance variations due to movement of the microbeam 25 are not drown out in an essentially constant total capacitance.

In practice, preliminary measurements of such a high kinetic inductance, single-loop electrical resonators have shown that inductance values of about 200 nH, with parasitic capacitances in the order of 1 or even 0.5 fF could be obtained, which is much better than in the above-mentioned article, in which, for an (essentially magnetic) inductance of about 60 nH, the parasitic capacitance of the inductance is about 3 femtofarad.

Besides, dispensing with a spiral track allows a significant simplification of the device manufacture, by reducing the number of lithography levels to be performed (since it is not necessary to make a bridge spanning the turns, from the center to the outside of the spiral).

The kinetic inductance Lc in question may, for example, be defined as the total inductance Ltot of the electric track minus its magnetic inductance Lm. The value of the kinetic inductance can thus be easily determined by measuring the total inductance and calculating (for example by finite elements) the magnetic inductance, the latter being entirely determined by the geometry of the electric track. It can also be determined by comparing the inductance of the track measured at a temperature above and then at a temperature below a critical temperature of the superconducting material forming the track (critical temperature beyond which the material is no longer superconducting).

By high kinetic inductance it is meant, for example, a kinetic inductance greater than 3 times the magnetic inductance of the track. For example, the track in question may have a kinetic inductance per square higher than or equal to 20 picohenry per square, or even higher than or equal to 50 picoHenry (pH) per square. By kinetic inductance per square it is meant the kinetic inductance of a square-shaped track section (as seen from above). Thus, as an example, a portion of track whose length is equal to 100 times its width will have a kinetic inductance equal to (or at least close to) 100 times its kinetic inductance per square. As an indication, for a track having a width between 50 and 500 nanometers, the kinetic inductance of the track in question, per unit length, may be greater than 0.1 nH/µm, or even greater than 0.3 nH/µm or even greater than 1 nH/µm.

To achieve such values, the thickness ep of the track is chosen to be particularly small, for example smaller than the London wavelength in the superconducting material forming the track. In practice, the thickness ep of the track is less than 20 or even 10 nm. Here for example, it is between 3 and 10 nm.

Here, the track in question, as well as the first and second electrodes of the capacitor 42, are made of titanium nitride TiN. This material has the benefit of being able to be deposited in a very thin layer (for example, 10 nm thick) with good homogeneity (whereas homogeneous Aluminum layers are difficult to achieve below 30 nm thick, for example), and of resisting chemical attacks with hydrofluoric acid necessary to obtain the micromechanical resonator.

In addition to guaranteeing a high kinetic inductance, making the track very thin in this way ensures good mechanical properties for the oscillator, as the mass added by the electrode at the microbeam is reduced to a strict minimum (and the dissipative phenomena that can occur during the deformation of the conductive material are also minimized).

Other superconducting materials than TiN, such as niobium nitride NbN or a granular superconducting material, could nevertheless be contemplated to make this track. By granular superconducting material it is meant, for example, a material formed by grains of a superconducting material, each having a typical dimension (for example diameter) of less than 10 nm. The grains in question may in particular be separated from each other by thin layers of an insulating oxide (for example, AlOx if the material is granular aluminum).

The system 1 described above can be manufactured by virtue of a manufacturing method that primarily comprises the following steps of:
optionally thinning a part of the top layer 7 of the substrate 4, and then full-plate depositing of a layer of the superconducting material intended to form the electrical track of the inductor 41, and then lithographing and etching the top layer 7 and the layer of superconducting material covering it, in a same pattern defining the mechanical resonator 30, the ring cavity 10 and the optical transmission line 51, and which also defines subsidiary openings passing through the top layer 7 for the subsequent release of the spacer layer 6 by chemical attack, and then lithographing and etching the layer of superconducting material in a pattern defining the electrical track which forms the inductance 41 and which also defines the first and second electrodes 43, 44 of the capacitor 42 and the electrical transmission line 47, and then etching the spacer layer 6 by chemical attack, especially to release the mechanical resonator 30.

In order to obtain very smooth flanks for the waveguide which forms the ring-shaped cavity, in order to increase its quality factor, it is possible to provide, after the step of lithographing the resin layer during which the pattern of the cavity is defined, a heating sub-step, during which an increase in the temperature of the resin layer makes it possible, by creep, to make its flanks smoother, without asperities, which then allows a more regular etching of the waveguide flanks. O2, H2, He plasmas can also be used after etching to smooth the surfaces of the waveguide.

Different alternatives can be made to the system just described, in addition to those mentioned above.

Thus, for example, regarding the zipper element, it would be possible to have crenellated patterns on only one of the two arms of the cavity, the other arm being flat, smooth, without patterns (it will be noted that lateral confinement between planar facets would also be obtained in this configuration). Moreover, the grooves provided on the flanks of these arms could have a different profile than the one (trapezoidal) described above, for example a hemicircular or triangular profile. Moreover, in some configurations, the two arms could possibly both be smooth.

More generally, patterns of another type, such as through holes in the microbeam and/or waveguide, could be employed. Such holes could also be made, in addition to the grooves made in the flanks of the arms of the zipper element, to obtain a mode adaptation when switching from the zipper zone to the annular-shaped photonic circuit.

Regarding the mechanical resonator, it could comprise a single microbeam, instead of two. The microbeams could each have a free end, instead of being attached at both ends.

Regarding the inductor, instead of comprising a single rectangular turn, it could comprise a turn of another shape, for example circular, or with meandering or zig-zag portions. It could also include a few turns instead of a single turn. Nevertheless, desirably, over most of its length, or even over its entire length, the track that forms the inductor will not include parts extending opposite each other while being separated by a gap of less than five times, or even ten times, the width of the electrical track (with the exception of the parts forming the capacitor electrodes), in order to limit the parasitic capacitance of the track.

The invention claimed is:
1. An electro-optical conversion system comprising:
an opto-mechanical conversion device including:
a ring cavity formed by an optical waveguide which extends along an annular closed curve,
a micromechanical resonator comprising at least one microbeam, and a zipper type element integrated to the ring cavity, said zipper type element including a first arm and a second arm which extend parallel to each other, opposite each other, the first arm being made on a portion of the ring waveguide while the second arm is made on the microbeam, the microbeam and said portion of the ring waveguide being laterally separated from each other by a gap which varies at least locally when the microbeam oscillates, and comprising an electrical capacitor that includes a first electrode and a second electrode, the first electrode moving relative to the second electrode when said microbeam oscillates.

2. The electro-optical conversion system according to claim 1, wherein at least one of the first and second arms has a line of patterns repeated periodically or semi-periodically along that arm.

3. The electro-optical conversion system according to claim 2, wherein grooves are periodically or semi-periodically distributed on a flank of said microbeam located opposite a flank of said portion of the ring waveguide, or wherein grooves are periodically or semi-periodically distributed on a flank of said portion of the ring waveguide located opposite a flank of said microbeam.

4. The electro-optical conversion system according to claim 3, wherein said patterns comprise protruding planar facets located on the flank of said microbeam or on the flank of said portion of the ring waveguide, separated two by two by said grooves.

5. The electro-optical conversion system according to claim 4, wherein a gap, which separates said portion of the ring waveguide from said microbeam at said planar facets, is less than 0.1 micron.

6. The electro-optical conversion system according to claim 2, wherein the microbeam comprises a flank located opposite a flank of said portion of the ring waveguide, and wherein said patterns are patterns internal to the arm under consideration, which are located neither on the flank of the microbeam nor on the flank of said portion of the ring waveguide.

7. The electro-optical conversion system according to claim 2, wherein said line of periodically or semi-periodically repeated patterns is located on the first arm of the zipper type element, and wherein another line of periodically or semi-periodically repeated patterns is also present on the second arm of the zipper type element.

8. The electro-optical conversion system according to claim 1, wherein the microbeam extends from a first end to a second end of the microbeam, and is held fixed at both ends.

9. The electro-optical conversion system of claim 1, wherein the ring cavity and the microbeam are etched into a silicon top laye of a Silicon-on-Insulator substrate.

10. The electro-optical conversion system according to claim 1, wherein the micromechanical resonator comprises an additional microbeam, said microbeam and said additional microbeam connecting to each other by at least one of their respective ends, the micromechanical resonator having a symmetrical oscillation mode for which a center of mass of the assembly comprising the microbeam and the additional microbeam remains stationary.

11. The electro-optical conversion system according to claim 10, wherein:
the microbeam and the additional microbeam are etched into a membrane, formed by a first material,
the additional microbeam is separated from a main, fixed part of said membrane by a narrow slit which extends parallel to said additional microbeam,
at least a part of a top face of the additional microbeam is covered by said first electrode, formed by a second material being electrically conductive,
said second electrode extends side by side with the first electrode, parallel to the first electrode, and over the fixed main part of said membrane, on another side of said slit, and wherein
said microbeam has a top face that is substantially devoid of said electrically conductive second material.

12. The electro-optical conversion system according to claim 1, comprising an electrical resonant circuit including said electrical capacitor as well as an inductor.

13. The electro-optical conversion system according to claim 12, wherein said inductor includes an electrical track of very small thickness made of a superconducting material chosen so that said track has a high kinetic inductance.

14. The electro-optical conversion system according to claim 13, wherein said thickness is less than 20 or even 10 nanometers and wherein the superconducting material is one of the following materials: titanium nitride, niobium nitride or a granular superconducting material.

15. A method for manufacturing an electro-optical conversion system comprising an opto-mechanical device, from a substrate comprising a silicon oxide layer and a silicon layer on the silicon oxide layer, the method comprising the following steps:
lithography and etching of the silicon layer, in a pattern defining:
a mechanical resonator comprising at least one microbeam,
a ring cavity formed by an optical waveguide which extends along a closed annular curve, and
a zipper type element integrated to the ring cavity, said element including a first arm and a second arm which extend parallel to each other, opposite each other, the first arm being made on a portion of the ring waveguide while the second arm is made on the microbeam, and then
etching the silicon oxide layer by chemical attack, to release the mechanical resonator and the ring cavity,
the method also including making, on the silicon layer, an electrical capacitor including a first electrode and a second electrode, the first electrode moving relative to the second electrode upon oscillation of said microbeam.

* * * * *